US006196460B1

(12) United States Patent
Shin

(10) Patent No.: US 6,196,460 B1
(45) Date of Patent: Mar. 6, 2001

(54) AGE VERIFICATION DEVICE

(75) Inventor: Min Chul Shin, Lakewood, CA (US)

(73) Assignee: Cardcom, Inc., Buena Park, CA (US)

( * ) Notice: Subject to any disclaimer, the term of this patent is extended or adjusted under 35 U.S.C. 154(b) by 0 days.

(21) Appl. No.: 09/134,069

(22) Filed: Aug. 13, 1998

(51) Int. Cl.[7] ........................... G06K 5/00; G06K 13/06; G06K 19/06

(52) U.S. Cl. ........................... 235/380; 235/483; 235/493

(58) Field of Search .................................... 235/380, 381, 235/382, 483, 493

(56) References Cited

U.S. PATENT DOCUMENTS

| | | | |
|---|---|---|---|
| 3,622,989 | 11/1971 | Dowdy | 382/126 |
| 3,781,855 | 12/1973 | Killen | 382/126 |
| 3,806,874 | 4/1974 | Ehrat | 235/380 |
| 4,300,042 | 11/1981 | Oldenkamp et al. | 235/449 |
| 4,506,148 | 3/1985 | Berthold et al. | 235/380 |
| 4,511,908 | 4/1985 | Small | 283/904 |
| 4,587,379 | 5/1986 | Masuda | 379/91.01 |
| 4,788,420 | 11/1988 | Chang et al. | 235/483 |
| 4,795,898 | 1/1989 | Bernstein et al. | 235/380 |
| 4,982,072 | 1/1991 | Takigami | 235/382 |
| 4,998,753 | 3/1991 | Wichael | 283/82 |
| 5,055,660 | * 10/1991 | Bertagna et al. | 235/472 |
| 5,283,781 | 2/1994 | Buda et al. | 370/246 |
| 5,671,282 | 9/1997 | Wolff et al. | 380/51 |
| 5,696,739 | 12/1997 | Chang | 368/29 |
| 5,714,747 | 2/1998 | West et al. | 235/493 |
| 5,719,939 | 2/1998 | Tel | 283/107 |
| 5,722,526 | 3/1998 | Sharrard | 235/381 |
| 5,732,136 | 3/1998 | Murphree et al. | 235/380 |
| 5,864,623 | 6/1999 | Messina et al. | 235/380 |

FOREIGN PATENT DOCUMENTS

| | | | |
|---|---|---|---|
| 3100792 | * | 4/1991 | (JP) . |
| WO 8803297 | * | 5/1988 | (WO) . |

OTHER PUBLICATIONS

International Bar Code (IBC): "Smart Mag AV" (www.interbar.com/smagav.htm) No date given.*

* cited by examiner

*Primary Examiner*—Michael G Lee
*Assistant Examiner*—Larry Taylor
(74) *Attorney, Agent, or Firm*—Hogan & Hartson L.L.P.

(57) ABSTRACT

The invention relates to an electronic age verification device that reads data stored on a data carrier or readable medium, such as a driver's license or identification card, then calculates and displays information such as the license or cardholder's age and the expiration status of the license or identification card.

2 Claims, 3 Drawing Sheets

AGE VERIFICATION DEVICE

BACKGROUND OF THE INVENTION

Many products, such as alcoholic beverages and tobacco products, are unsuitable for minors, but are sold in locations where minors are present. Accordingly, vendors of such products are generally required to verify the age of buyers who appear to be underage. However, verification of a buyer's age by means of observing the buyer's identification card or driver's license, and calculating the buyer's age therefrom, is unreliable because such documents can be easily falsified, or the customer's age may be miscalculated by the vendor. Worse yet, oftentimes such verification may not occur at all because the fast-paced sales of high volume stores leave little time for store clerks to mentally calculate a customer's age, and such verification is inconvenient.

Therefore, a more reliable and efficient method for verification of age and other information, such as the expiration date of a driver's license, is needed. The implementation and widespread use of electronic devices that can readily and reliably verify the correct information contained in driver's licenses and photo identification cards (ID cards) would further discourage falsification of ID cards and serve as an important deterrent for underage teenagers against activities such as providing false evidence of age to obtain alcoholic beverages, cigarettes, and other "age-controlled" products and services.

DESCRIPTION OF THE PRIOR ART

Each driver's license or ID card can be encoded with indicia, in a magnetic strip or bar code, indicative of the correct identity of the driver or license holder, such as date of birth, expiration date, address, and other personal identifying information (e.g., eye glass requirements, height, weight, organ donation). Commonly, driver's licenses contain a magnetic strip in the back, along the side, for storing these types of data. Such cards are inexpensive to manufacture and issue to millions of drivers.

Magnetic strips are known in the art and representative cards are disclosed in U.S. Pat. Nos. 4,506,148 to Berthold et al. issued on Mar. 19, 1985, and 5,714,747 to West et al. issued on Feb. 3, 1998. In particular, U.S. Pat. No. 4,998,753, issued to Wichael, on Mar. 12, 1991, claims a multi-purpose computer-readable driver's license having a machine-readable magnetic tape adapted to store important information such as social security numbers, credit rating, traffic citations, and the like.

Driver's licenses or ID cards are inserted into a magnetic reader or swiped through a magnetic reader which reads optical, magnetic or electronic data, thereby generating an identification signal. The magnetic reader reads the encoded information on the magnetic strip and transmits the encoded information to a microprocessor contained within the device. For instance, the '747 patent to West et al. describes a magnetic reader used for reading magnetically encoded information within driver's licenses and plastic I.D. cards. U.S. Pat. No. 4,788,420 to Chang et al., issued on Nov. 29, 1988, discloses another typical magnetic card reading system and apparatus used for reading credit cards.

U.S. Pat. No. 5,719,939 to Tel et al., issued on Feb. 17, 1998, describes a system and method of verifying the legitimacy of a product against forgery by providing unique patterns of overlying individual fibers which cannot be copied. U.S. Pat. No. 5,732,136 to Murphree et al., issued on Mar. 24, 1998, teaches a typical method for merchants to verify the authenticity of debit cards by assessing and comparing information stored in the credit cards and the information provided by a network, to determine the delinquent or legitimate status of credit cards presented by buyers for payment.

However, the above-noted measures do not provide a simple, efficient and speedy method of verifying age in the context of purchasing alcohol, tobacco or other "age controlled" products and services.

U.S. Pat. No. 5,696,739 to Chang et al., issued on Oct. 29, 1996, teaches an alcohol and tobacco electronic identification calendar that can be used in connection with verification of age and identification of customers. This electronic device is designed to provide cashiers with ALCOHOL YEAR and TOBACCO YEAR. More particularly, this invention provides a perpetual calendar wherein the current time, date, month, year, and legal ages for alcohol and tobacco purchase of a particular state are entered and set into an electronic device. The device calculates the difference between the current year and the year of birth for consumers of legal age, and displays the corresponding tobacco and alcohol year. The month and date run perpetually according to the current date set, and the electronic calendar perpetually calculates the corresponding dates for alcohol and tobacco purchases. For example, the device constantly updates and displays the exact date for alcohol and tobacco purchases which, in turn, must be visually and mentally compared by the store clerk with the date of birth of individual buyers.

Therefore, in practice, a cashier would request a photo ID card or a driver's license from a customer who appears to be underage, check the date of birth on his or her license and compare it with the date displayed on the perpetual calendar. If the date of birth is after the alcohol or tobacco year displayed i.e., the date shown in the calendar, then the customer would not be allowed to purchase the product in question. Thus, the electronic device calendar disclosed in the '739 patent serves as a calculator for determining the difference between today's date and the date the person must have been born to be legally allowed to purchase alcohol or tobacco. This device does not calculate or display the individual's age and/or the expiration date of the driver's license, nor does it provide a means by which the validity of driver's licenses or ID cards can be readily verified.

Another drawback of the '739 perpetual calendar is that the store clerk must visually compare the date of birth that appears on the driver's license to the date shown on the perpetual calendar. Therefore, the effectiveness and reliability of the verification method associated with this prior art device depends heavily on the accurate observations and mental calculations performed by store clerks. As described earlier, in a fast-paced environment where mental calculations and observations are not reliable, mistakes are likely to occur with the use of this type of device.

A device called "ID-Check," manufactured by Intelli-Check, Inc., is an electronic device that reads the magnetic strip or bar code encoded in government-issued driver's licenses. A driver's license is inserted or scanned through a magnetic reader, and the mechanism within the device interprets the information contained in the driver's license. The device then illuminates an indicator panel to show a check mark if the buyer is older than a preset age for an alcohol or tobacco product, or an "X" mark if the buyer is below the preset age. However, the exact age of the buyer is not displayed. This device also illuminates indicator panels to show whether a driver's license is expired or possibly tampered with, or if the device is out of paper. The device also prints a record of these transactions.

Because the ID-Check does not display the exact age of the buyer, the vendor must rely upon the preset age stored in the device, which must be updated on a daily basis, and upon the decision performed by the device that the buyer is old enough to purchase the product in question. Thus, the ID-Check does not provide the vendor with information necessary for the seller to determine the age of the buyer. Rather, it performs superfluous functions which are not essential for purposes of simply verifying the age and the expiration dates on driver's licenses. Moreover, the ID-Check does not provide a low-cost means by which an effective and speedy verification of the buyer's age and driver's license expiration dates can be performed because of the relatively high retail cost of the device.

Another device, the Verifone® System, consists of a card slot connected to a Verifone® Point-of-Sale payment terminal. The system is located on the sales counter and the clerk swipes the driver's license through the card slot. In order to verify if a sale is permitted, the clerk must identify the type of product the customer is buying, i.e., tobacco or alcohol. In response to this input, the system displays any of the following four messages: (1) "OK To Purchase Alcohol," (2) "OK To Purchase Tobacco," (3) "Denied—Underage," or (4) "Denied—Invalid Card." The system does not directly display the customer's age. Thus, similar to Intelli-Check, Inc.'s ID-Check, described above, the Verifone® System provides a number of features that are also superfluous and unnecessary to verify the age of a customer and the expiration on the ID card.

SUMMARY OF THE INVENTION

Accordingly, the present invention relates to a compact, low-cost electronic age verification device that captures date of birth and expiration dates from driver's licenses and other government-issued identification cards, suitable to be used in governmental agencies (e.g., for verifying senior citizen discounts), in large supermarket or grocery chain stores, gas stations, and small businesses that sell tobacco, alcohol, lottery tickets, and other "age-controlled" consumer goods or services to the general public.

An object of the invention is to provide an electronic age verifier capable of reading data stored in magnetic strips, linear and high-density bar codes, contact and non-contact IC cards, and capable of displaying processed data on a liquid crystal display (LCD) or some other equivalent type of flat electro luminescent (EL) display.

The present invention provides the essential components for a portable age verifier terminal which includes an operational switch, a main control unit (MCU), an operational amplifier therefor (OP-AMP), a liquid crystal display (LCD), means for requesting display of the output information (display control), means for resetting the device (clock setting switch), an associated card reader unit (magnetic head), a buzzer for convenient operation (audio output), a power supply regulator (DC adapter), and a power supply such as a battery. The basic circuit manufactured to fit the needs of the age verifier includes a timetable function, such as a resident real time clock (RTC).

To perform its basic functions, the main control unit decodes the information contained in the magnetic strip or bar code in a driver's license or ID card as the store clerk swipes the customer's driver's license through the magnetic head reader or card slot. The main control unit captures the expiration date of the driver's license in order to determine its status.

If the license is valid and not expired, the main control unit compares the decoded date of birth stored in the driver's license against the RTC, and calculates the exact age of the card holder. Subsequently, the LCD associated with the main control unit displays the exact age of the license holder on the LCD screen. If the age shown is less than the legal age permitted for purchasing alcohol or tobacco in a particular state (usually 21 for alcoholic beverages and 18 for tobacco), then the store clerk knows that the person is not legally allowed to buy the product in question.

On the other hand, if the driver's license is expired, the LCD screen of the device displays "EXPIRED" and the cashier becomes aware of the possibility that the driver's license has been falsified or is no longer a legally valid proof of age.

Consequently, the age verifier terminal provides a simple, speedy and effective portable electronic apparatus that relies on a real time clock function and uses time-related verification as one of its most independent functions. Thus, it is a further object of the present invention to provide a stand-alone and portable electronic device that can overcome the drawbacks of the prior art in terms of cost, simplicity and efficiency.

DESCRIPTION OF THE FIGURES

A better understanding of the advantages and simplicity of the present invention can be gained from a consideration of the following descriptions of the preferred embodiment thereof, wherein.

DETAILED DESCRIPTION OF THE INVENTION

The foregoing is meant to illustrate, but not to limit, the scope of the invention. Indeed, those of ordinary skill in the art can readily envision and produce further embodiments, based on the teachings herein, without undue experimentation.

Personal identification such as driver's licenses may consist of government-issued identification cards, having a magnetic strip or other readable medium affixed to a semi-flexible polyvinyl chloride (PVC) card located on one side of the driver's license. By way of example, driver's licenses may be approximately 3⅜ inches by 2⅛ inches (about 9.5 centimeters by 5.4 centimeters). The card thickness is standard and about 1/32 inch. From the illustrations of FIG. 1, it will be appreciated that the overall dimensions of the age verifier terminal 11 are not substantially greater than the corresponding card dimensions, thus making the use of the present invention quite practical and non-cumbersome to operate within the limited space of busy checkout terminals of stores and supermarket counters.

Figure 1:
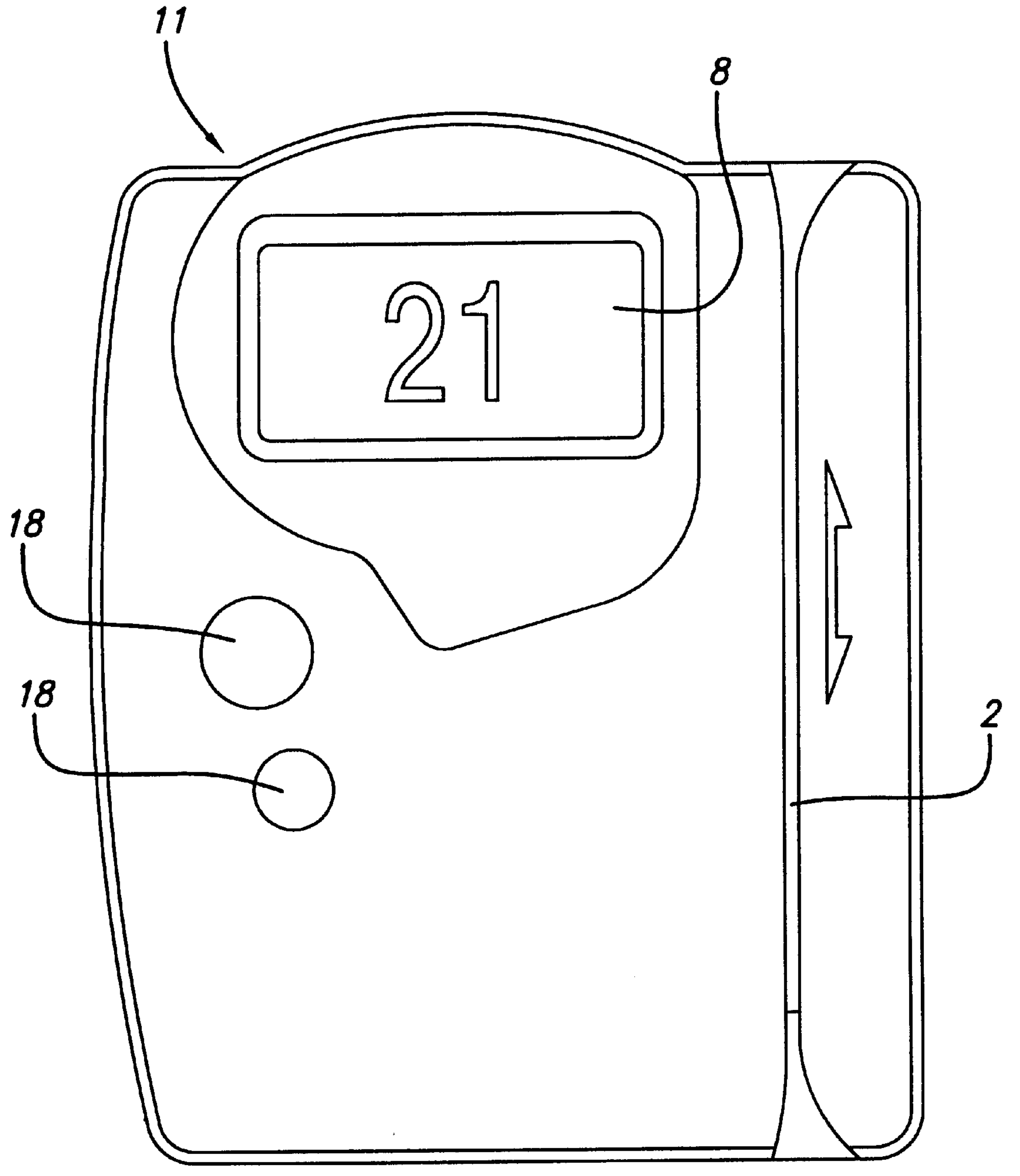
FIG. 1 is a plan view of the age verifier terminal, illustrating a card insertion slot for reading the driver's license in accordance with the present invention.

It is to be understood that the form and shape of the device depicted in FIG. 1 has been chosen only for the purpose of describing a particular embodiment and function of the invention, and that the material of the invention can be addressed in various ways and incorporated in other types of devices.

For example, with reference to FIG. 1, an age verifier terminal 11 is shown which is designed to received data from a magnetic strip or bar code of a driver's license or identification card, to perform calculations and deliver the requested output information to an external output display screen, such as a liquid crystal display 8. The age verifier terminal 11 comprises a card insertion slot 2 for receiving information stored in a driver's license or ID card.

Figure 2:
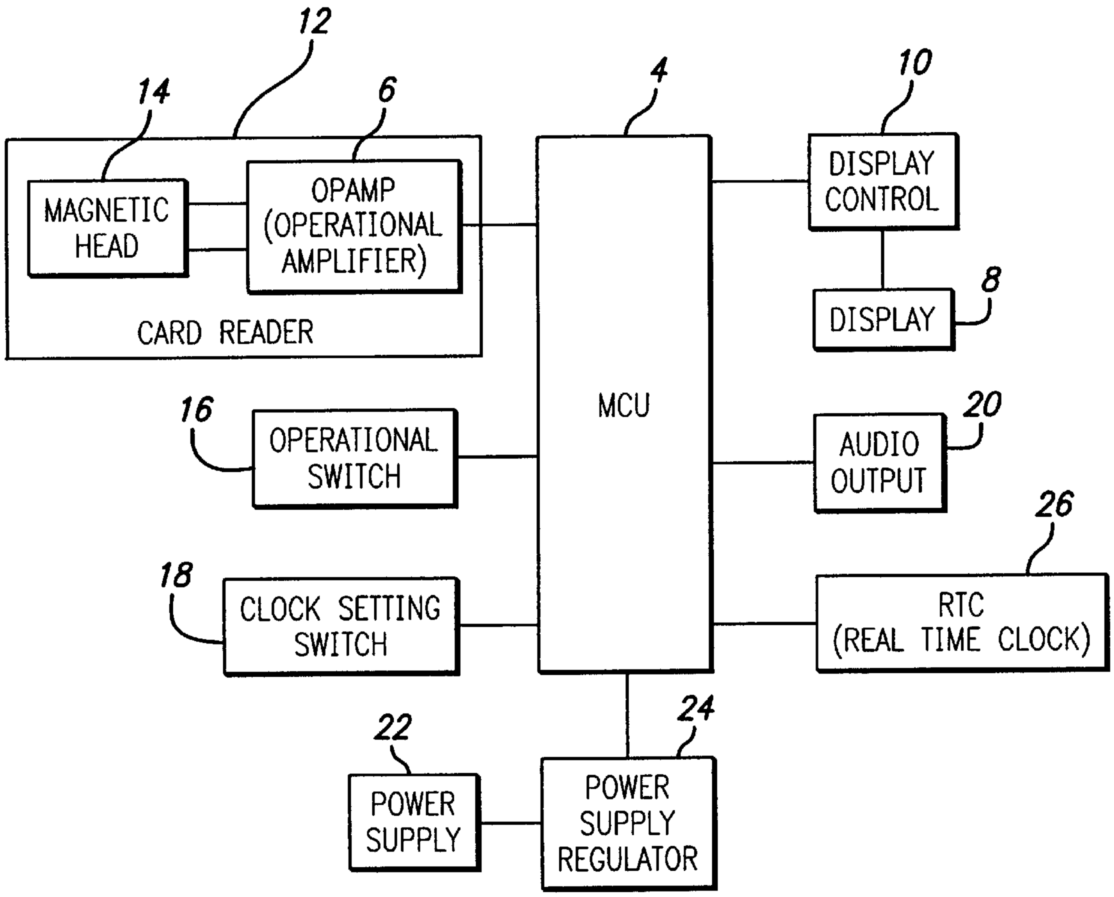
FIG. 2 is a block diagram illustrating the functional components of the age verification device; and, FIG. 3 is a general flow chart illustrating the sequence and function of the date processing steps of the present invention.

As illustrated in FIG. 2, one embodiment of the age verifier terminal 11 comprises the following components: a main circuit unit (MCU) 4, an operational amplifier (OP-AMP) 6, a liquid crystal display (LCD) 8, a display control 10, a card reader unit 12 containing a magnetic head 14, an operational switch 16, clock setting switch 18, an audio output 20, a power supply 22, a power supply regulator 24, and a Real Time Clock (RTC) 26.

Currently, a typical driver's license or personal photo identification card has magnetically coded information storage capabilities. The birth date and expiration date are inscribed on the front of the card by characters and encoded in the back thereof with a direct machine readable language, which in turn may be read by readers such as the magnetic head 14.

A magnetic strip is encoded with information in optical, magnetic or electronic form, containing date of birth, expiration date and other information representative of the true identify of the person identified in the driver's license.

Although the embodiment described in FIG. 1 is used with a card having information coded in a magnetic strip, cards having other types of symbology may be used in connection with the present invention. For instance, Linear Barcode (one-dimensional) and the latest advent in data capture and decoding has been the development of two-dimensional bar codes, containing high-density (Hi-density) symbols that use both height and weight to represent data. This type of stacked linear code can be used with the portable electronic device of the present invention. In particular, Hi-density symbologies, such as PDF417 (Portable Data File), MaxiCode, Datamatrix and Aztec symbologies among others, are particularly suitable to be used in connection with driver's licenses and ID cards because of their high-data capacity codes and new application opportunities. For example, PDF417 is a high-density stacked linear symbology, created by Symbol Technologies, that may store as much as 1.1 kilobytes of data in a single card-size label. Inexpensive to print and difficult to alter, PDF417 labels provide additional security to government agencies desiring to issue secure and relatively inexpensive ID cards.

Therefore, the magnetic reader 14 may be replaced by a (Linear Barcode) Hi-density reader for reading and decoding two-dimensional (2D) symbologies, such as readers manufactured by Symbol Technologies [PDF Card Readers, PDF Charged-Couple Device (CCD) Scanners] or WelchAllyn® (IMAGETEAM™).

Thus, upon insertion or swiping of a driver's license into the card reader slot 2 (FIG. 1), the card reader unit 12 reads the magnetic strip and transmits the information from the magnetic strip to the MCU 4, which is located within the compact design of the age verifier system 11. The MCU 4, commonly found in available card readers, captures and uploads card data or information to the host system. The MCU 4 is also the central computerized unit of the invention which comprises a microprocessor for computing and calculating the exact age of the license holder by performing a comparison between the date of birth encoded in the driver's license and the RTC 26 as well as capturing the expiration date of the driver's license, in order to deliver the output information to the LCD screen display 8.

The MCU 4 receives the converted and amplified card data from the OP-AMP unit 6, which analyzes the data and displays the appropriate output data through the LCD 10 and audio output 20. The OP-AMP unit 6 amplifies the current signals received from the magnetic strip of the driver's license and provides enough output voltage for the MCU 4 to process the encoded data by digitizing the fine analog signals from the magnetic head 14 and sending these signals to the MCU 4 for further processing.

The function and processes of each of the components shown in FIG. 2 are described more fully below.

The card reader unit 12 detects the magnetic strip recorded on the magnetic track on the thin, rigid, but bendable plastic driver's license card as the driver's license is passed through the insertion slot 2 along a linear direction, which provides a fixed way for guiding the driver's license when it is passed through the insertion slot 2.

Typical magnetic strip readers as disclosed in prior art patents used for compact application devices are suitable for use with the present invention. A significant goal of the present invention is to retain the major advantages of the presently available readers including linear and 2-D bar code readers. Thus, in accordance with this embodiment, it is conceived that scanning or reading of magnetic strip or bar code signals can be performed by a number of readers.

The invention shown in FIGS. 1 and 2 further includes a display mechanism having a graphics liquid crystal display (LCD) 8 for display of user-recognizable data as provided by MCU 4. The LCD 8 may also be adapted to be illuminated by a power supply 22 to enable viewing of the screen in low ambient light conditions. The direct current (DC) power regulator 24 may be provided to power the LCD 8. The LCD 8 is suitable for use with the present invention because it is light in weight and relatively immune to mechanical injury. Display control 10 is further provided to display the time to the LCD 8.

The LCD 8 also features an idle mode which allows the device to function in lower power, namely, power save mode. During this mode, the LCD 8 displays the time. A clock setting switch 18 further provides a toggle display to show the date and year. On the other hand, when the age verifier terminal is in active or full power mode, the present invention displays one of the following three messages after a driver's license has been swiped: (1) "RETRY" when a error has occurred during the reading of the data; (2) "EXPIRED" when the driver's license or ID card has expired; or (3) a numeric value representing the age of the person.

Another component of the invention's MCU 4 is the resident real time clock, RTC unit 26, which provides the critical time and date information needed for performing the essential verification functions. The RTC unit 26 may reside in the MCU 4, wherein the information decoded from the driver's license, namely, the expiration date and the date of birth is compared against the RTC unit 26.

The MCU 4 subtracts the date of birth information (e.g., day, month, year) from the current date and time obtained from the RTC unit 26, and the MCU 4 accurately calculates the current age of the driver's license holder, which is prominently displayed in the LCD 8.

The present invention further includes a power supply unit 22 for enabling operation of the MCU 4 and providing power to the MCU's circuitry. Generally, lithium-ion class batteries are used as a suitable power source due to their relatively long life and stable discharge characteristics. Other technologies may be implemented, including but not limited to, rechargeable alkaline, nickel-cadmium, and nickel metal hydroxide batteries. Because of its stand-alone feature, the age verifier terminal 11 can be used with a battery compartment for receiving and storing a conventional alkaline disposable battery.

Therefore, the age verifier terminal 11 can be powered by either a battery or an AC/DC adapter, wherein the power supply unit 22 can be switched from the battery to the AC/DC adapter, with the switching being performed when the power supply regulator 24 is attached to the age verifier terminal 11 without the need to interrupt the power supply to the MCU 4. A conventional construction of this type of power supply for the present invention can include a plug to the AC/DC adapter associated with a commercially available power source that is connected to a jack provided in the outer casing of the age verifier terminal 11.

The present invention may also provide for a power supply regulator 24. This element detects the level of battery power and determines whether the power supply is almost depleted to a critical level. The power supply regulator 24 provides for a mechanism whereby low power signals are sent to the MCU 4. Subsequently, the MCU 4 sends this "low power supply" signal or message to the audio output unit 20 and LCD 8.

Another component of the present invention is the audio output unit 20. For instance, if the MCU 4 executes a processing command by calculating the difference between the driver's date of birth and the date in the RTC 26, and the resultant age is less than 21, this particular customer is not permitted to purchase the "age-controlled" product in question. Similarly, if the MCU 4 determines that the date of expiration occurred prior to the date in the RTC 26, the card has expired and is no longer valid. Subsequently, the MCU 4 activates an alarm to inform the person in charge of this fact through the medium of sound alarm and allows him or her to take appropriate measures. The audio output unit 20 outputs a sound in the form of a user-recognizable voice or buzzer. For instance, the buzzer may sound once for a good read of the card data, and sound twice if the magnetic strip cannot be read properly or if there is an error. The audio output unit 20 may also produce a three-buzzer sound to warn the store clerk when there is a shortage of power during the battery operation of the age verifier terminal 11.

The age verifier terminal 11 also includes an operational switch unit 16 and clock setting switch unit 18. The operational switch unit 16 generates an automatic or manual interrupt to switch the age verifier terminal from its set idle mode to its active mode for prompt card-reading operation. The clock setting switch unit 18, on the other hand, provides a means for the user to adjust the time, date and year, during the terminal's normal operation life. The user can selectively use the buttons provided to display the time, date and year and set the correct time accordingly.

Figure 3:
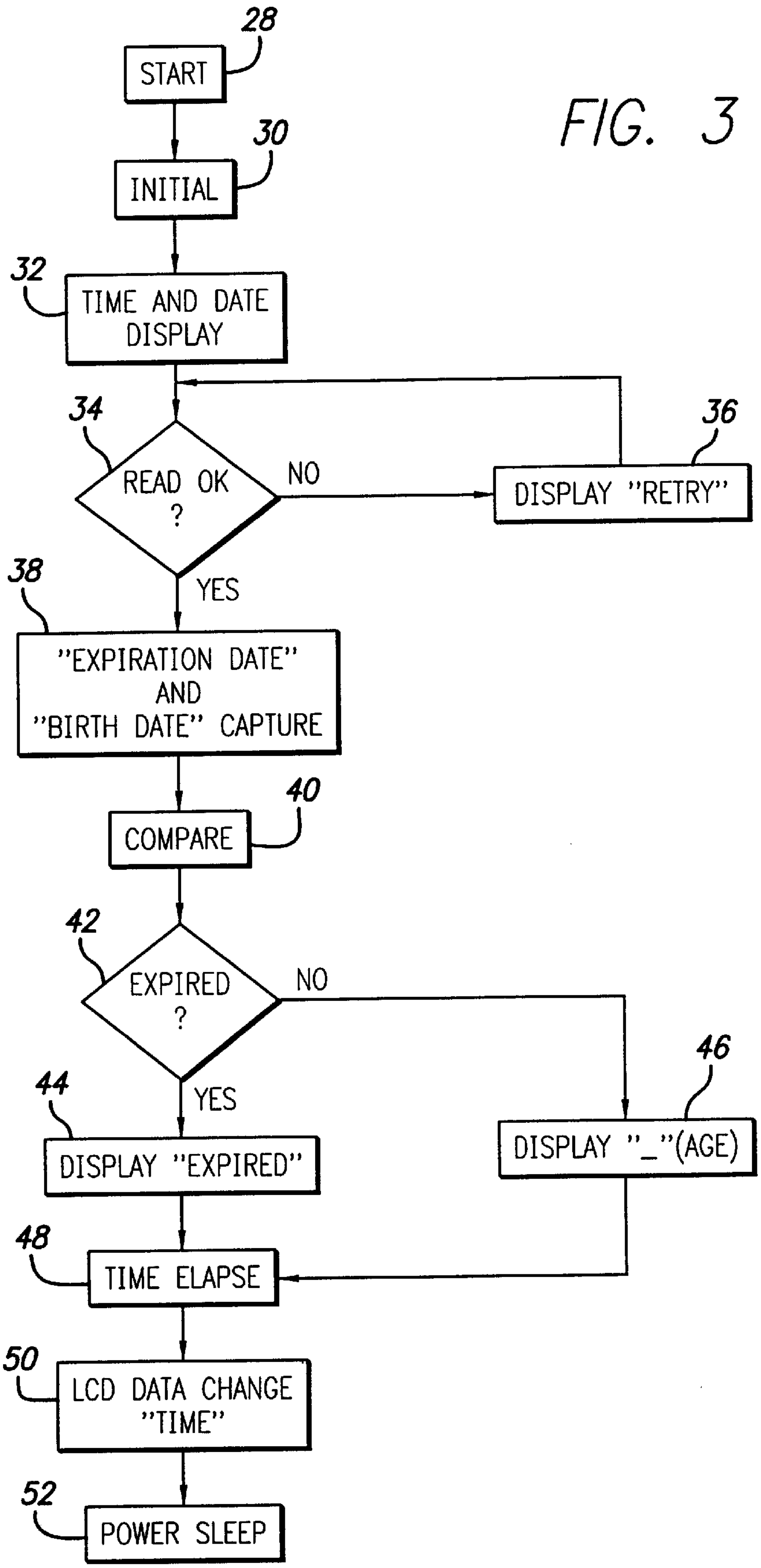

In the embodiment described in FIGS. 1 and 2, the sequence of steps for using the age verification device for verification of age and expiration date of driver's licenses is illustrated in FIG. 3. In steps 28 and 30, the age verifier terminal 11 is ready to accept input from an ID card or driver's license, and is initialized by the user. When the age verifier terminal 11 is not in use, however, the LCD 8 displays the current time and date set by the RTC 26 in step 32. When the magnetic head 14 reads the magnetic strip of the ID card in the driver's license in step 34, the MCU 4 captures the electronic signals for further processing.

A decision is made in step 34 whether or not the magnetic reader head 14 is able to effectively read the information contained in the magnetic strip. If the information cannot be read and the age verifier terminal 11 rejects the encoded information contained in the driver's license, then the MCU 4 routes the user to step 36, wherein the user is instructed to re-insert the card and swipe it for a second time.

If at the decision step 34, the magnetic head 14 properly captures the expiration date and the date of birth information (step 38), then in step 40, MCU 4 compares the date in RTC 26 with the expiration date stored in the ID card or driver's license. If the expiration date captured occurred prior to the corresponding date in RTC 26 as determined by MCU 4 (step 42), then the ID card or driver's license will be determined to be expired in step 44. If the ID card has expired, then the expiration date is displayed in the LCD 8 at the succeeding step 44. The LCD 8 in this preferred embodiment shows the word, "EXPIRED," and/or the actual expiration date. Accordingly, the cashier or retailer is warned that the driver's license is not a valid identification card for purposes of purchasing any government "age-controlled" consumer goods or services and is further warned that the card may have been either forged, falsified, borrowed, or stolen. Once the "EXPIRED" display is shown in the LCD 8, no further verification procedure takes place.

On the other hand, if MCU 4 determines at the decisional step 42 that the expiration date on the magnetic strip or bar code has not expired, i.e., the date of expiration occurs at a date and time later than the date in the RTC 26, then MCU 4 directs the LCD 8 to display the exact current numerical age of the driver's license holder, after subtracting the date of birth captured from the date in the RTC 26. For example, the display message may read, "AGE 21," or "21" if the driver's license holder was born on Jan. 1, 1978 and the date in the RTC 26 is Jan. 1, 1999 (step 46).

After the age has been displayed in step 46, the cashier or merchant can determine whether the sale of alcohol, tobacco, or other "age-controlled" products is permitted under the laws of that particular jurisdiction.

When the age verifier terminal 11 has displayed either the "EXPIRED" or "" numeric value (age) message, the functional operations of the age verifier terminal 11 have been completed. In the subsequent step 48, a brief period may elapse before the LCD 8 toggles back to display the current time and date, as shown in step 50. The age verifier terminal 11 then can enter a "power sleep" mode (power save mode or idle mode) as described above, designed to conserve power, in step 52, by displaying the time (hour and minutes), or date (month, day and year), wherein the terminal awaits the user to re-set the terminal for a new subsequent transaction. The user can press the set buttons or keys provided in the top casing of the age verifier terminal 11 to enter the full power or active mode, or simply swipe the card into the card reader 12.

Although the invention has been described in conjunction with an exemplary embodiment shown in the accompanying drawings, it should be understood that many modifications, variations and changes in the steps or sequence of steps of the methods described herein will readily occur to those skilled in the art without departing from the spirit and scope of the invention as set forth in the claims.

What is claimed is:

1. An age verification device for reading date of birth information magnetically encoded on a driver's license, said device comprising:

a portable terminal having a card insertion slot;

a magnetic head within said terminal, said magnetic head being positioned at said card insertion slot in order to read date of birth information from the driver's license, said magnetic head generating signals in response to the date of birth information read by said magnetic head;

an operational amplifier electrically coupled to said magnetic head, wherein said operational amplifier amplifies signals received from said magnetic head;

a microprocessor electrically coupled to said operational amplifier, wherein said microprocessor calculates the current age of the person who was issued the driver's license from said amplified signals, said microprocessor determining if said current age is greater than a preselected minimum age;

a real time clock electrically coupled to said microprocessor, wherein said real time clock provides time and date information to said microprocessor in order for said microprocessor to calculate said current age;

a liquid crystal display on the exterior of said terminal, wherein said liquid crystal display graphically displays said current age from signals provided by a display control electrically coupled to said microprocessor;

an audio output unit electrically coupled to said microprocessor, wherein said audio output unit produces an alarm sound under conditions comprising said current age being less than the minimum age;

a power supply electrically coupled to said microprocessor, wherein said power supply provides power to said microprocessor through a power supply regulator, said power supply regulator being capable of detecting a low power level in said power supply and sending a low power supply signal to said microprocessor; and an operational switch electrically coupled to said microprocessor, wherein said operational switch generates an interrupt signal to switch said terminal from an idle mode to an active mode.

2. The device of claim 1, wherein said magnetic head reads expiration date information magnetically encoded on the driver's license and said microprocessor determines whether the driver's license is valid or has expired.

* * * * *